(12) United States Patent
Boonekamp et al.

(10) Patent No.: US 11,391,441 B2
(45) Date of Patent: Jul. 19, 2022

(54) LIGHTING DEVICE WITH CONTROLLABLE LIGHT OUTPUT CHARACTERISTICS VIA AN OPTICAL SHEET

(71) Applicant: SIGNIFY HOLDING B.V., Eindhoven (NL)

(72) Inventors: Erik Paul Boonekamp, Eindhoven (NL); Adrianus Johannes Stephanus Maria De Vaan, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/047,767

(22) PCT Filed: Apr. 29, 2019

(86) PCT No.: PCT/EP2019/060857
§ 371 (c)(1),
(2) Date: Oct. 15, 2020

(87) PCT Pub. No.: WO2019/211214
PCT Pub. Date: Nov. 7, 2019

(65) Prior Publication Data
US 2021/0172585 A1    Jun. 10, 2021

(30) Foreign Application Priority Data
May 1, 2018    (EP) .................................... 18170231

(51) Int. Cl.
*F21V 14/06*     (2006.01)
*F21S 4/28*      (2016.01)
(Continued)

(52) U.S. Cl.
CPC ................. *F21V 14/06* (2013.01); *F21S 4/28* (2016.01); *F21V 5/007* (2013.01); *F21V 11/12* (2013.01);
(Continued)

(58) Field of Classification Search
CPC .......... F21V 14/06; F21V 11/10; F21V 11/12; F21S 4/28; F21S 10/00
See application file for complete search history.

(56) References Cited

U.S. PATENT DOCUMENTS 6,154,320 A * 11/2000 Itoh ...................... G02B 27/283
                                                       348/E9.027
6,769,777 B1 * 8/2004 Dubin ................... F21V 11/186
                                                              353/97
(Continued)

FOREIGN PATENT DOCUMENTS

JP    2004199891 A    7/2004
JP    2012505428 A    3/2012
(Continued)

*Primary Examiner* — Rajarshi Chakraborty
*Assistant Examiner* — Michael Chiang
(74) *Attorney, Agent, or Firm* — Daniel J. Piotrowski

(57) ABSTRACT

A lighting device comprises a planar array of LEDs comprising a set of parallel LED strips and an optical sheet extending over and parallel to the plane of the array of LEDs. The optical sheet comprises an interleaved pattern of parallel optical strips and pass through strips and it is movable relative to the array of LEDs to create different output beam characteristics.

14 Claims, 10 Drawing Sheets

(51) Int. Cl.
    *F21V 5/00*         (2018.01)
    *F21V 11/12*      (2006.01)
    *F21Y 105/16*      (2016.01)
    *F21Y 115/10*      (2016.01)
    *F21Y 103/10*      (2016.01)
    *F21Y 105/10*      (2016.01)
    *F21S 10/02*       (2006.01)

(52) U.S. Cl.
    CPC ......... *F21S 10/026* (2013.01); *F21Y 2103/10* (2016.08); *F21Y 2105/10* (2016.08); *F21Y 2105/16* (2016.08); *F21Y 2115/10* (2016.08)

(56) References Cited

U.S. PATENT DOCUMENTS

| | | | |
|---|---|---|---|
| 8,120,833 B2 * | 2/2012 | Chan | G02B 26/02 |
| | | | 359/233 |
| 8,262,252 B2 | 9/2012 | Bergman et al. | |
| 8,629,930 B2 | 1/2014 | Brueckner et al. | |
| 9,605,830 B1 | 3/2017 | Winters et al. | |
| 2008/0273324 A1 | 11/2008 | Becker et al. | |
| 2010/0103663 A1 | 4/2010 | Kubis et al. | |
| 2011/0280018 A1 * | 11/2011 | Vissenberg | G02B 26/0883 |
| | | | 362/277 |
| 2013/0308311 A1 | 11/2013 | Hsu et al. | |
| 2016/0010811 A1 | 1/2016 | Benitez et al. | |
| 2016/0018081 A1 | 1/2016 | Kadoriku et al. | |
| 2016/0230952 A1 | 8/2016 | Dingemans et al. | |
| 2017/0023211 A1 | 1/2017 | Sepkhanov et al. | |

FOREIGN PATENT DOCUMENTS

| | | | | |
|---|---|---|---|---|
| JP | 2013530503 A | | 7/2013 | |
| KR | 2012128484 A | | 11/2012 | |
| KR | 101418257 B1 | | 7/2014 | |
| WO | 2010041182 A1 | | 4/2010 | |
| WO | 2011027254 A1 | | 3/2011 | |
| WO | WO-2011027254 A1 * | | 3/2011 | ........... G03B 21/208 |
| WO | 2011132108 A1 | | 10/2011 | |
| WO | 2013142436 A1 | | 9/2013 | |

* cited by examiner $$p_{LEDrow} = w + s$$

LIGHTING DEVICE WITH CONTROLLABLE LIGHT OUTPUT CHARACTERISTICS VIA AN OPTICAL SHEET

CROSS-REFERENCE TO PRIOR APPLICATIONS

This application is the U.S. National Phase application under 35 U.S.C. § 371 of International Application No. PCT/EP2019/060857, filed on Apr. 29, 2019, which claims the benefit of European Patent Application No. 18170231.7, filed on May 1, 2018. These applications are hereby incorporated by reference herein.

FIELD OF THE INVENTION

This invention relates to lighting devices, such as luminaires, which have a controllable light output characteristic such as a beam shape.

BACKGROUND OF THE INVENTION

The beam profile is a key parameter in the design of a luminaire. It is essential that the characteristics of the output beam fit the intended application.

Many industrial, office and retail spaces have different required lighting functions over time. It is therefore attractive to have luminaires with an adaptable beam which can be modified to fit the new application situation. Most luminaires for industrial and office applications consist of a large array of LEDs, and beam tuning is consequently a problem which is not easy to solve.

An often used solution is the installation of additional LEDs to those required for delivering the desired light flux. For example, by independent dimming of two LED arrays (with different optics for each array), a dynamic beam can be generated, for example one which changes gradually from a narrow beam to a more wide beam. This approach is of course costly because of the duplication of LEDs needed. Over-installation of LED also requires much more space in the fixture.

An optical solution to avoid over-installation of LEDs is to use two optical plates in front of the LED array. These two optical plates are then capable of moving, for example rotating, with respect to each other. This is particularly suitable for (small) LED spot lights as used in retail spaces.

Examples are for example shown in WO 2010/041182 and U.S. Pat. No. 8,262,252. These types of approach typically require accurate alignment between the LEDs and the optical plate, and for example have a one-to-one association between optical features of the optical plate and the LEDs. The known solutions may also be complex and costly to implement.

SUMMARY OF THE INVENTION

The invention is defined by the claims.

According to examples in accordance with an aspect of the invention, there is provided a lighting device comprising:

a planar array of LEDs comprising a set of parallel LED strips;

an optical sheet extending over and parallel to the plane of the array of LEDs, the optical sheet comprising an interleaved pattern of parallel optical strips and pass through strips, wherein the inactive strips have an average width which is at least 0.1 times the average width of the optical strips;

a drive arrangement for moving the optical sheet relative to the array of LEDs between at least two configurations:

a first configuration in which elongate axes of the LED strips are parallel to elongate axes of the optical strips; and a second configuration in which the elongate axes of the LED strips are angularly offset by an acute angle from the elongate axes of the optical strips.

The optical sheet has a design comprising strips of active material spaced by regions of inactive material (which may be gaps or a planar non-textured region of the optical sheet). A large collection of LED beams can be controlled by a single optical sheet. The optical structures on the sheet do not need to be correlated in a one-to-one relationship with the individual LEDs. Thus, preferably, the optical pattern carried by the optical parts of the optical sheet repeats with a greater pitch than the pitch of the LED array. It may not repeat at all, but may instead be a non-repeating global optical pattern over the entire LED array. The optical pattern may be a continuous pattern which has become discontinuous by introduction of the pass through regions. Thus the LED pattern (which is typically a regular array of LEDs in a square or rectangular arrangement) and the pattern of the optical strips are mutually different. Thus, a translation of the pattern of the optical strips when shifted laterally by the LED pitch results in a different local pattern over the LEDs.

The term "optic strip" or "optically active strip" are used to mean that a strip is provided with optical features which perform a beam redirection function. The optical features are for example shaped surface features which implement a refraction. In particular, the term "optically active" is not to be confused with polarization rotation of a chiral material (also sometimes known as optical activity). The term "pass through strip" "optically inactive strip" is used to mean that there are no such optical features, so that a simple pass through function is implemented.

The optical sheet consists of both pass through regions and optical regions which are for example covered or embedded with optical structures. The optical patterns can overlap the individual LEDs in different ways based on the chosen relative movement. This gives rise to different optical effects.

In the first configuration, the pass through strips are for example arranged over the LED strips and in the second configuration the optical strips partially overlap the LED strips.

Thus, there is a setting with uncovered LEDs and a setting with partially covered LEDs by the optical structures of the optical strips. The uncovered setting is for example a narrow beam setting. These options are used to create the complete far-field intensity profile. By making specific combinations of rotation and/or translation of the optical sheet, a wide range of smooth beams can be generated with full control of beam width and glare.

The moving of the optical sheet may be done using a motorized drive arrangement, but alternatively or additionally can be done manually. The drive arrangement may be for moving the optical sheet relative to the array of LEDs between at least three configurations, wherein in the third configuration the optical strips are arranged over the LED strips. Thus, there, is also a fully covered option. This may be a wide beam setting.

The drive arrangement may be controllable to move the optical sheet relative to the array of LEDs to implement relative rotation and/or relative translation. A translation may be used in combination with rotation so that the rotated sheet fits best within the outer profile of the lighting device. Thus, rotation about one axis in combination with a translation may be used to implement an effective rotation about a different axis.

The lighting device may comprise an array of collimating lenses over the planar array of LEDs, with each LED associated with a collimating lens. These lenses create the narrow beam profile when the LEDs are covered by the pass through strips. The optical strips then function to broaden the beam. The collimating lenses mean that the initial beam width introduced to the optical sheet is narrower than the bare (e.g. Lambertian) LEDs, not necessarily resulting in beams with parallel rays.

The invention is particularly suitable for use with a large number of LEDs, such as at least 20 LEDs, for example at least 50 LEDs, such as 100 LEDs.

The optical strips may comprise prisms or lenses. In one example, the optical active strips comprise prism ridges which, in the plane of the sheet, define circular, or elliptical, or other closed shape path portions. These portions may align between different strips so that together they define a global pattern as explained above, and so that an interrupted global prism or ridge pattern is formed by the combination of the optical strips.

The LED strips may have a first average pitch and the optical portions may have a second average pitch, wherein the ratio of the first average pitch to the second average pitch is in the range 0.8-1.25. Thus, the optical strip width and the LED pitch have a size of the same order of magnitude. If the ratio is selected to be unity, this means that each optical strip may be aligned with a respective LED strip.

The pass through strips have a width which is in a range 0.5 to 2 times the width of the optical strips, preferably in the range 0.7 to 1 times. Thus, the optical strip width and gaps between them have a size of the same order of magnitude. This for example gives the option of aligning either the optical strips or the pass through strips with a respective LED strip.

The optical sheet for example comprises a set of sheet portions, which are moved relative to the array of LEDs in synchronism, for example two sheet portions side by side along the direction of the elongate axis of the optical strips. By providing multiple portions, the additional size of the lighting device required to enable rotation within the outer housing is reduced.

The optical sheet (or each portion of the optical sheet) for example comprises one or more guide slots for constraining movement of the optical sheet, wherein the guide slots implement a predetermined combination of rotation and translation. The pass through strips may comprise openings between the optical strips.

The invention also provides an optical sheet for use in a lighting device, for provision over a planar array of LEDs which comprises a set of parallel LED strips, wherein the optical sheet comprises:

an interleaved pattern of parallel optical strips and pass through strips, wherein the inactive strips have an average width which is at least 0.1 times the average width of the optical strips.

This optical sheet is for use in the lighting device defined above.

The invention also provides a method of controlling a light output from a lighting device, wherein the lighting device comprises a planar array of LEDs comprising a set of parallel LED strips and an optical sheet extending over and parallel to the plane of the array of LEDs, the optical sheet comprising an interleaved pattern of parallel optical strips and pass through strips, wherein the inactive strips have an average width which is at least 0.1 times the average width of the optical strips, wherein the method comprises:

moving the optical sheet relative to the array of LEDs between at least two configurations:
a first configuration in which elongate axes of the LED strips are parallel to elongate axes of the optical strips; and
a second configuration in which the elongate axes of the LED strips are angularly offset by an acute angle from the elongate axes of the optical strips.

This method relates to the use of the lighting device defined above.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
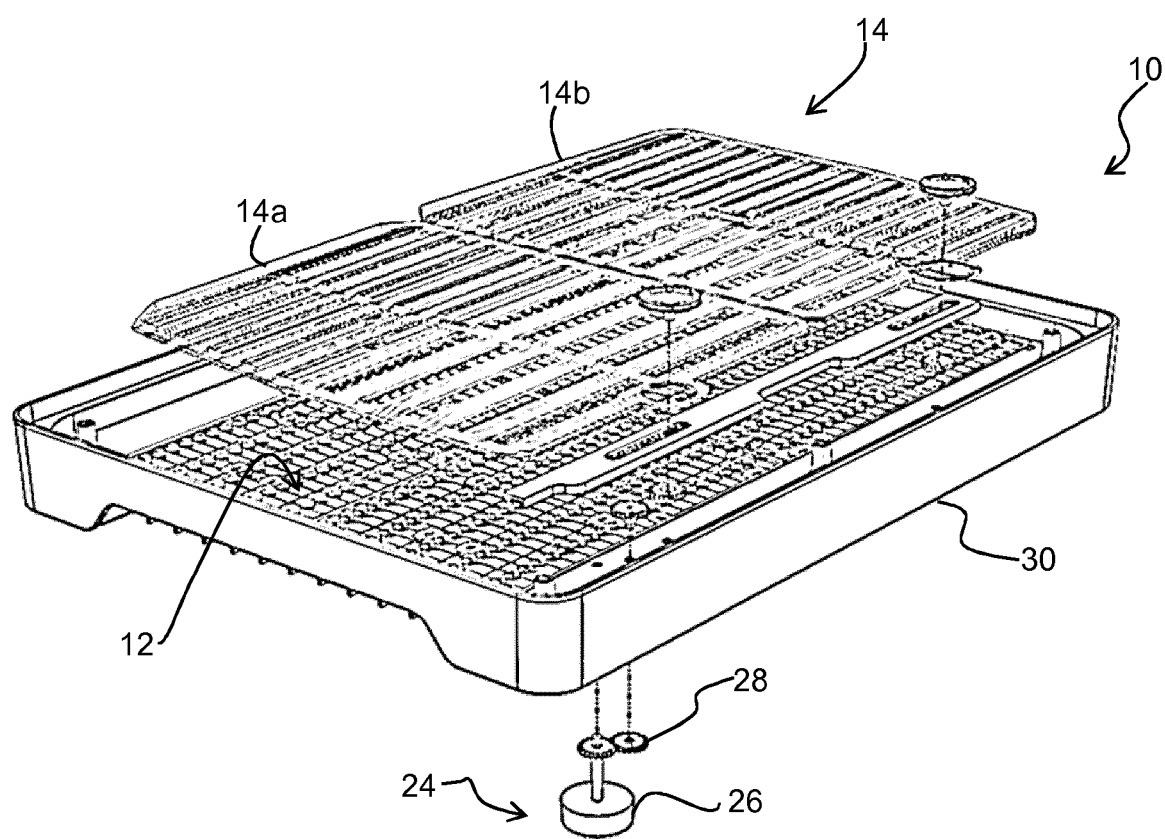
FIG. 1 shows a lighting device in the form of a luminaire, comprising a planar array of LEDs and a movable optical sheet comprising two portions.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting device comprising a planar array of LEDs comprising a set of parallel LED strips and an optical sheet extending over and parallel to the plane of the array of LEDs. The optical sheet comprises an interleaved pattern of parallel optical strips and pass through strips and it is movable relative to the array of LEDs to create different output beam characteristics.

FIG. 1 shows a lighting device 10 in the form of a luminaire, comprising a planar array 12 of LEDs comprising a set of parallel LED strips.

The LEDs may be arranged in a square array (i.e. with the same pitch between rows and columns) or a rectangular array (i.e. with a different pitch between rows than between columns). In either case, the array comprises rows and columns, one of which may be considered to define "strips".

An optical sheet 14 extends over and parallel to the plane of the array 12 of LEDs. The optical sheet 14 is shown elevated from the LEDs in FIG. 1 for clarity. In use, it is mounted close to the LED array to provide a low profile luminaire. In the example shown, the optical sheet 14 is formed as two sheet portions 14a, 14b. There may however be only a single sheet portion. There is a transparent front plate (glass or plastic such as polycarbonate) to protect the LED array and the adjustable optical sheet portions against water and dust (not shown in FIG. 1).

Figure 2:
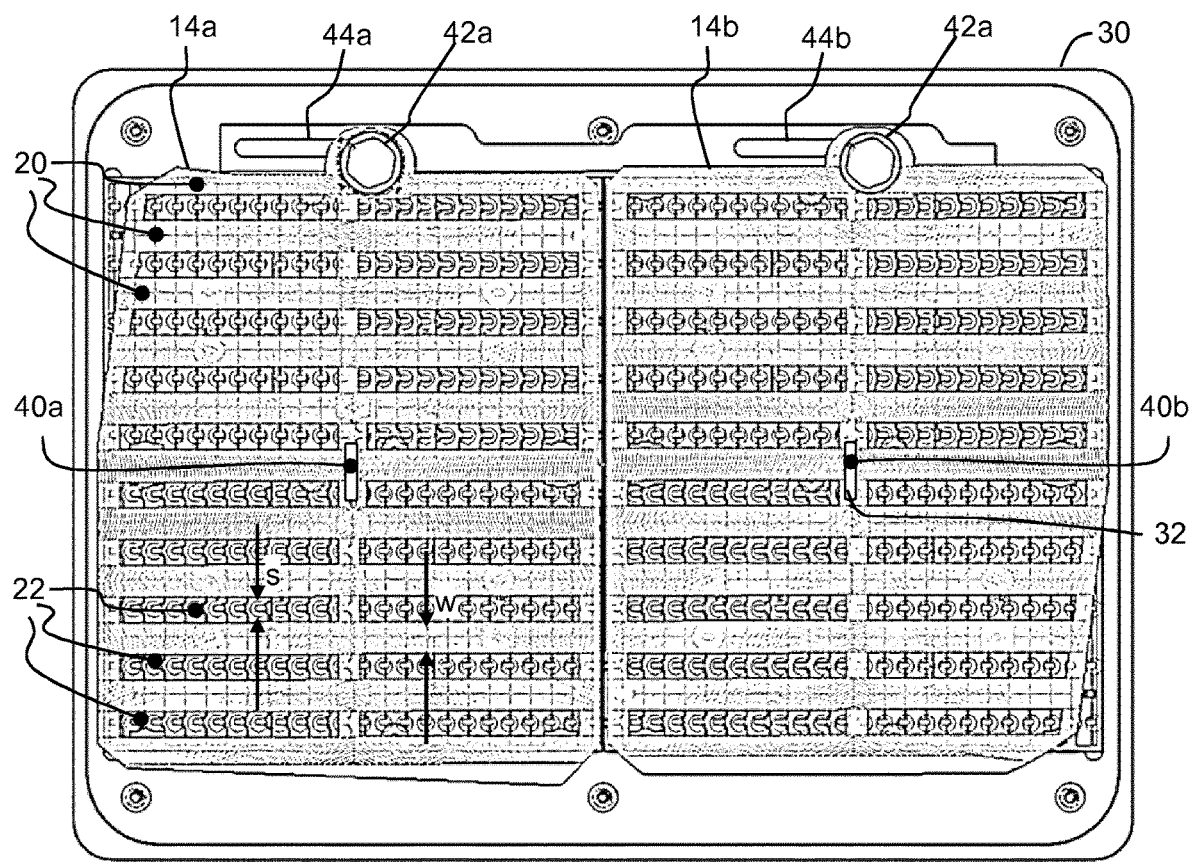
FIG. 2 shows a first orientation of the optical sheet.

FIG. 2 shows the optical sheet portions 14a, 14b with a first positional orientation.

The optical sheet portions each comprise an interleaved pattern of parallel optical strips 20 and pass through strips 22, wherein the inactive strips 22 have an average width (s) which is at least 0.1 times the average width (w) of the optical strips. More preferably, the optical strips and pass through strips have similar width, i.e. s is between 0.5 and 2 times w, for example s is between 0.5 and 1.3 times w.

The strips may define a uniform pattern as shown, i.e. all the optical strips 20 are the same width and the gaps (i.e. the pass through strips 22) have the same width. However, this is not essential.

The elongate direction of the strips generally corresponds to the LED strip elongate direction ("generally" because rotation by an acute angle is enabled).

A drive arrangement 24 (FIG. 1) is provided for moving the optical sheet portions relative to the array 12 of LEDs. It is shown as a motor 26 and a gear arrangement 28. Alternatively or additionally moving of the optical sheet may be done manually, for example by replacing the motor by a winding key, or for example by shifting the optical sheet by hand without use of a gear arrangement. The multiple sheet portions are driven in unison.

The example of optical sheet portion of FIG. 2 has at least one straight slot 32 which extends in the direction perpendicular to the elongate axis direction. By using the slot 32 as a guide, a desired combination of rotation and translation can be implemented. The sheet portion may be moved parallel to the straight slot 32 to implement a rotation, or rotated about a rotation pin extending into the slot. The rotation pins are shown as 40a and 40b in FIG. 2, and central slots 32 are shown which receive the pins.

The movement includes at least the possibility of implementing a relative rotation which may be combined with a translation. Of course, geometrically, a rotation and a translation implement a rotation about a different axis. Thus, the rotation may be implemented only as a rotation about a suitable axis, or if it is not desirable to have a rotation pin at that axis location, rotation may be about a different axis, and then accompanies by a translation. The aim is to provide rotational adjustment in such a way that the most compact housing is possible which accommodates the sheet portions in their different possible orientations.

Thus, there are at least two configurations: a first configuration in which elongate axes of the LED strips are parallel to elongate axes of the optical strips 20; and a second configuration in which the elongate axes of the LED strips are angularly offset by an acute angle from the elongate axes of the optical strips.

The movement also preferably includes the possibility of implementing a relative translation only. This translation is in a direction perpendicular to the elongate axis of the optical strips and pass through strips. Thus, it may be used to align either the optical strips 20 or the pass through strips 22 over the LED strips.

The LED array 12 is mounted on a printed circuit board. Each LED is also provided with a collimating lens to generate a narrow beam. There is preferably a large collection of LEDs such as more than 20 LEDs and more preferably more than 50 LEDs. The PCBs are mounted on a heat sink or metal housing 30.

The optical strips 20 include an optical pattern which can be based on prisms, lenslets (for example forming a lenticular arrays), Kohler lenses or other optical structures. The size of the individual optical structures is for example mm scale (e.g. 0.5-2 mm) or micron scale (10-100 μm). The optical sheet portions can each be a transparent polymer such as poly methyl methacrylate (PMMA) or polycarbonate (PC), or glass.

The rotation about, or translation along, the fixed rotation pins 40a, 40b is driven by a drive cog 42a, 42b at the edge of the optical sheet portions which drives along a drive slot 44a, 44b. By driving the drive cog along the drive slot, rotation and/or translation of the sheet portion is entrained.

Figure 3:
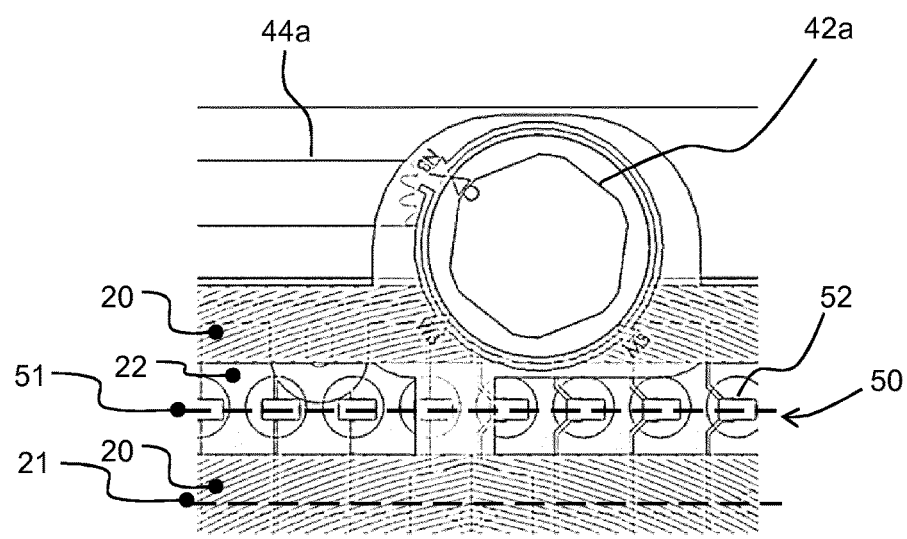
FIG. 3 shows a drive cog enlarged and shows a strip of LEDs.

FIG. 3 shows the drive cog 42a enlarged and it also shows more clearly the strip 50 of LEDs 52. The drive cog 42a is at the right end of the drive slot 44a and this corresponds to an orientation in which the LED strips 50 are parallel with the optical strips 20 (shown hatched) and hence also parallel with the inactive strips 22. The pass through strips 22 (i.e. the gaps) are over the LEDs 52.

Figure 4:
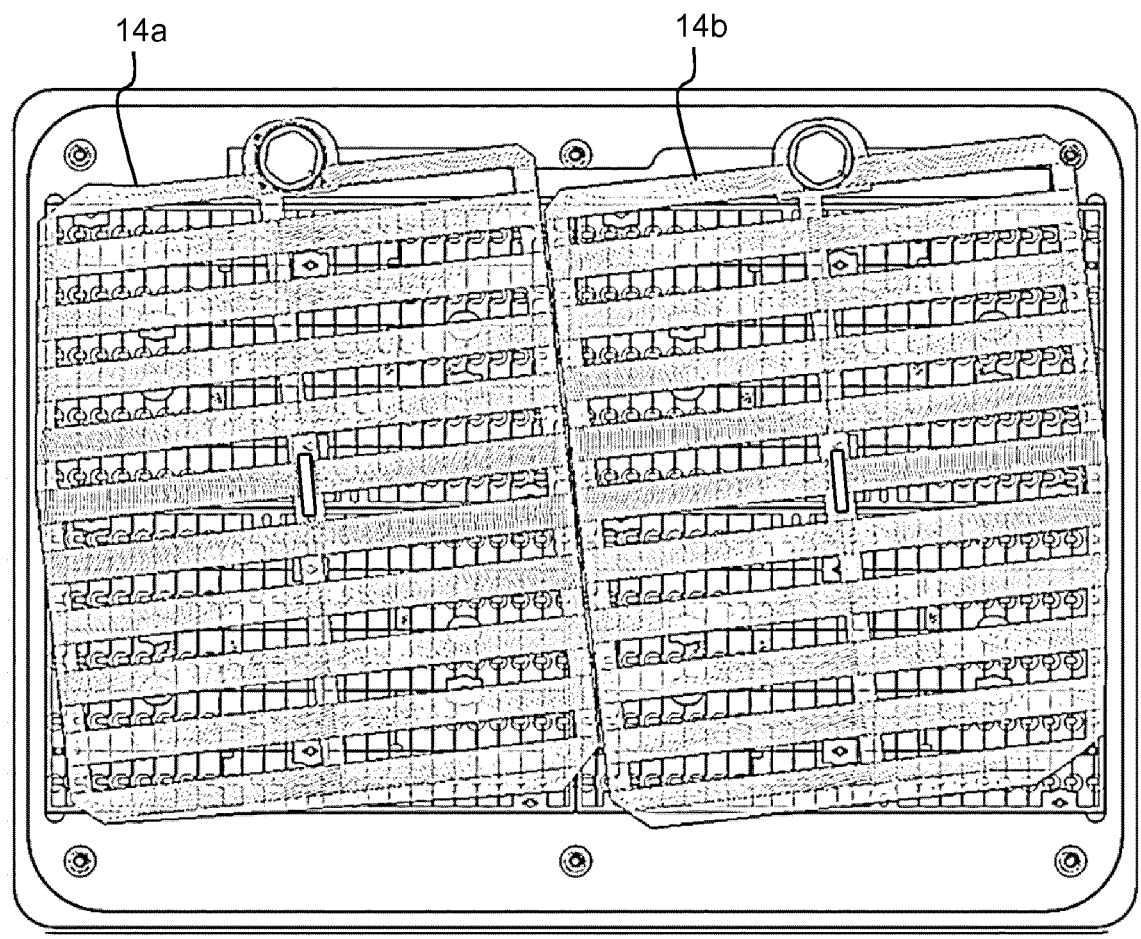
FIG. 4 shows a second orientation of the optical sheet after being rotated and translationally shifted.

FIG. 4 shows a second orientation in which the sheet portions 14a, 14b are rotated and optionally also translationally shifted as explained above.

Figure 5:
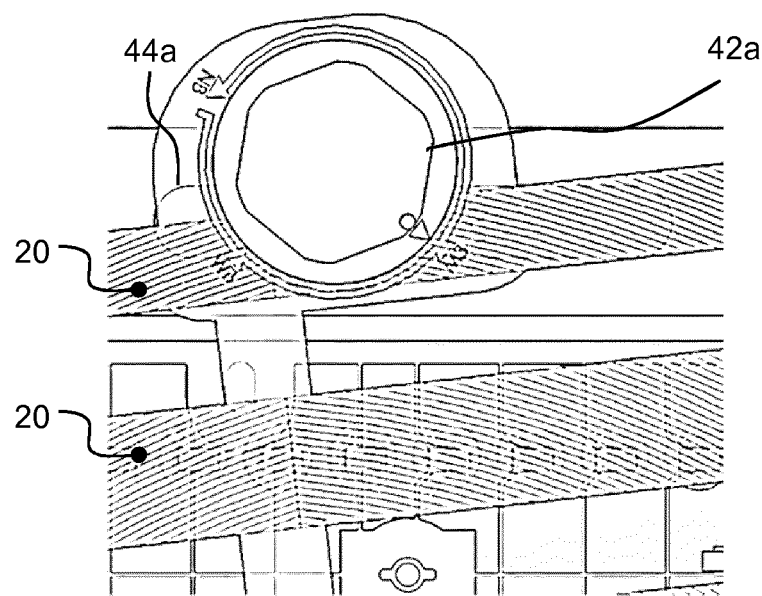
FIG. 5 shows that the corresponding drive cog arrangement.

FIG. 5 shows that the drive cog 42a is at the left end of the drive slot 44a and this corresponds to an orientation in which the LED strips are rotationally offset to the optical strips 20 (shown hatched). The angular offset means that gaps will be over some LEDs and optical strips will be over others, creating a different beam processing effect. A range of required output beams may be obtained based on the rotation and/or translation which is implemented.

Figure 6:
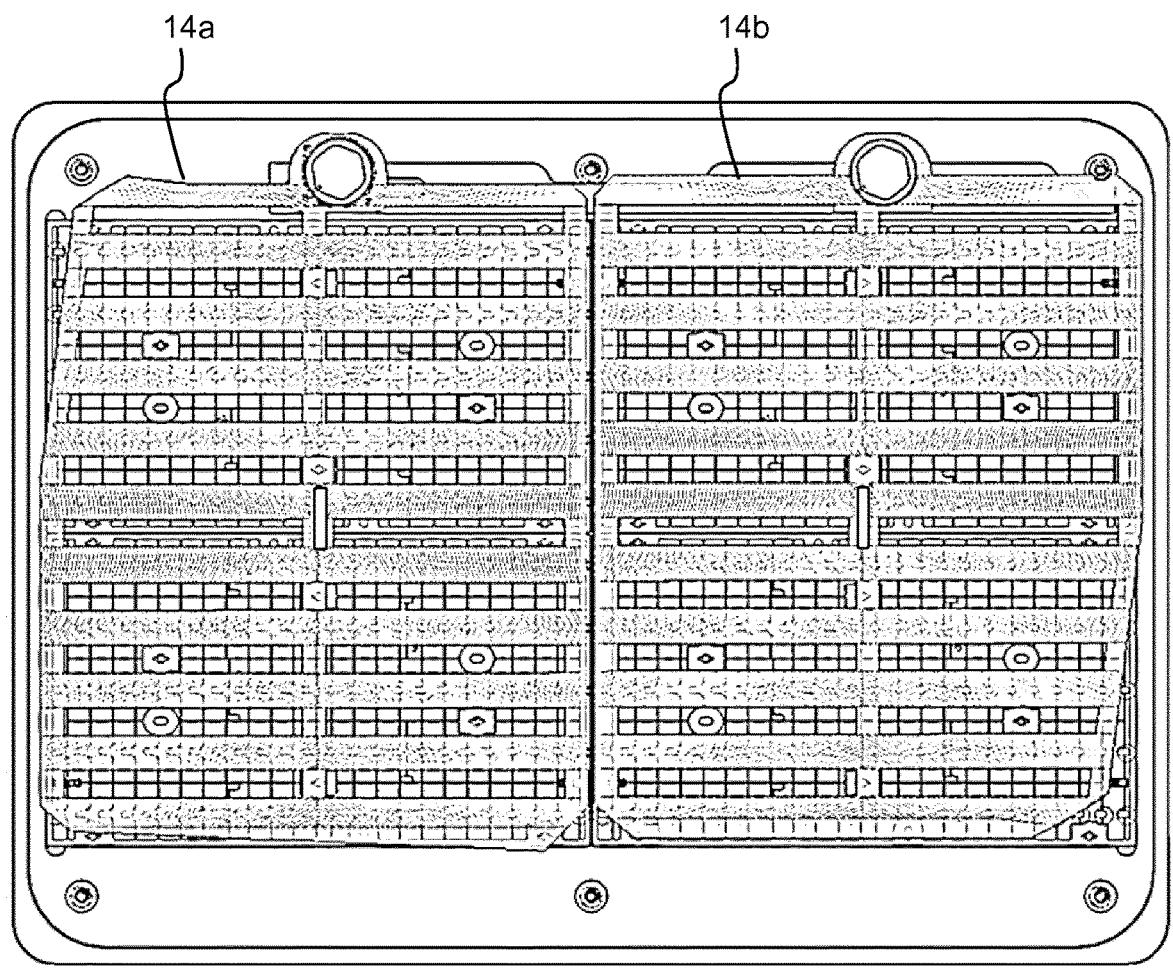
FIG. 6 shows a third orientation of the optical sheet after being only translationally shifted.
Figure 7:
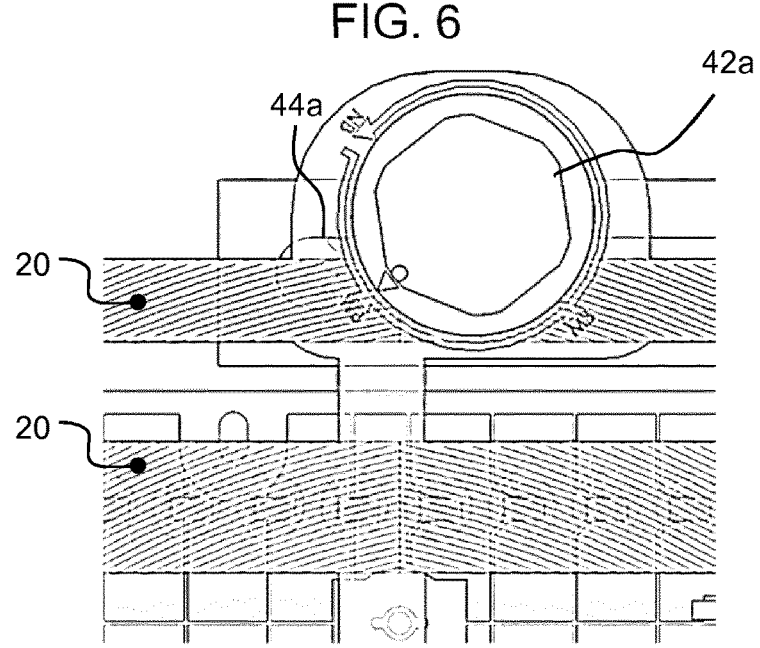
FIG. 7 shows the corresponding drive cog arrangement.

FIG. 6 shows a third orientation in which the sheet portions 14a, 14b are only translationally shifted, perpendicular to their length direction. FIG. 7 shows that the drive cog 42a is in a more middle region of the drive slot 44a and this corresponds to an orientation in which the optical strips 20 are translated so that they are parallel to the LED strips and they are also positioned over the LEDs.

Any suitable drive arrangement and cog arrangement may be used to enable selected rotation and/or translation between the desired sheet orientations and positions. In the example, shown, a translation of the sheet at the location of the drive cog left-right will cause a rotation about the pin, whereas a translation of the sheet at the location of the drive cog up-down will cause a translation relative to the pin.

Manual adjustment is one option, and the use of a small motor to implement driven adjustment is also possible.

Figure 8:
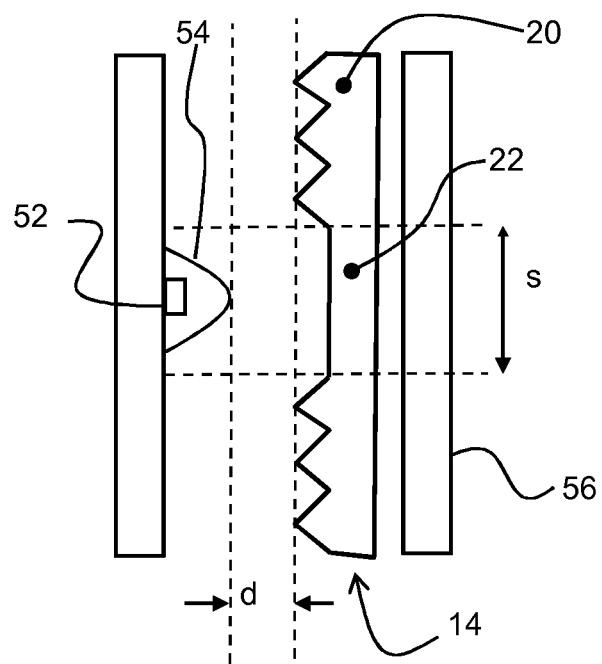
FIG. 8 shows a cross section of the optical system as well as a perspective view of the optical sheet portion.
Figure 8:
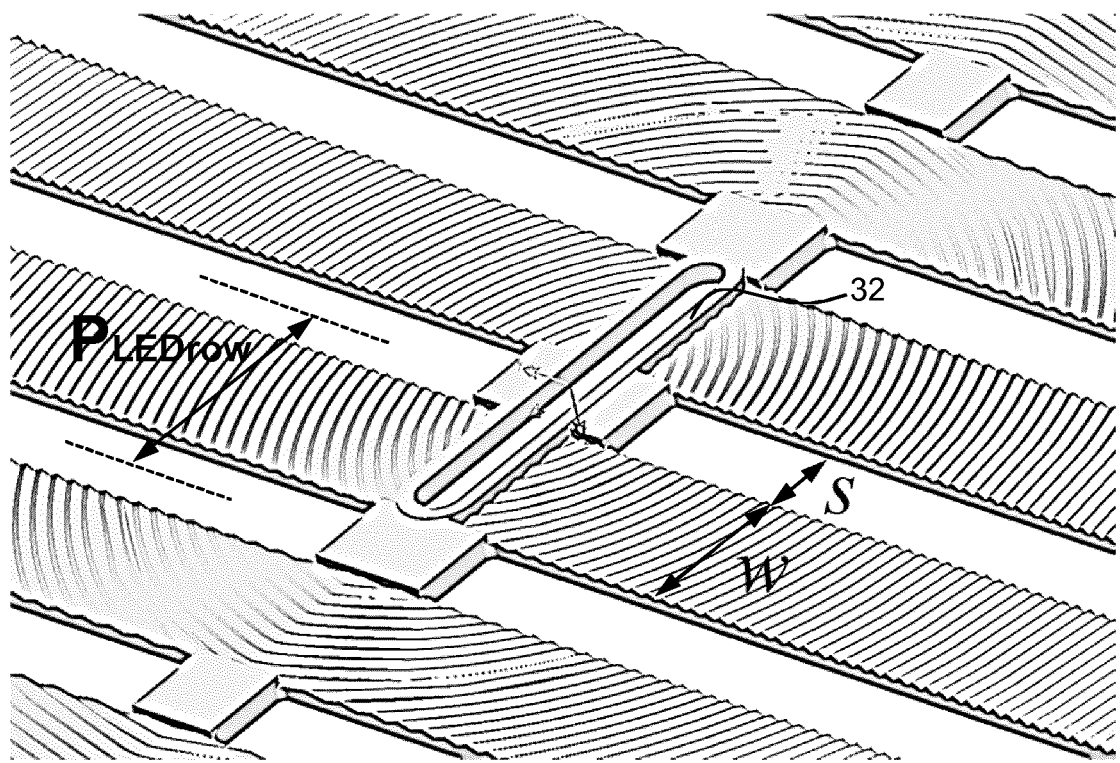

FIG. 8 shows a cross section of the optical system as well as a perspective view of the optical sheet portion. The primary beam is a narrow beam formed by a Lambertian LED 52 on which a collimating lens 54 is placed. For example after collimation, the full width at half maximum is between 5 and 90 degrees, and more preferably between 10 and 40 degrees. The protecting sheet 56 over the optical sheet 14 is also shown. By rotation and/or translation of the optical sheet, the generated beam by the luminaire can be made gradually wider.

As shown in the perspective view, the optical sheet comprises circular, elliptical or other closed shape prism segments, interrupted by the pass through strips. FIG. 8 shows the width w of the optical strips and the width s of the pass through strips. In a preferred example, they together correspond to the pitch $P_{LEDrow}$ of the LED strips, i.e. $P_{LED-row}$=w+s.

Thus, it is possible for either the optical strips or the gaps to overlie the LEDs, based on the relative translational position.

Figure 9:
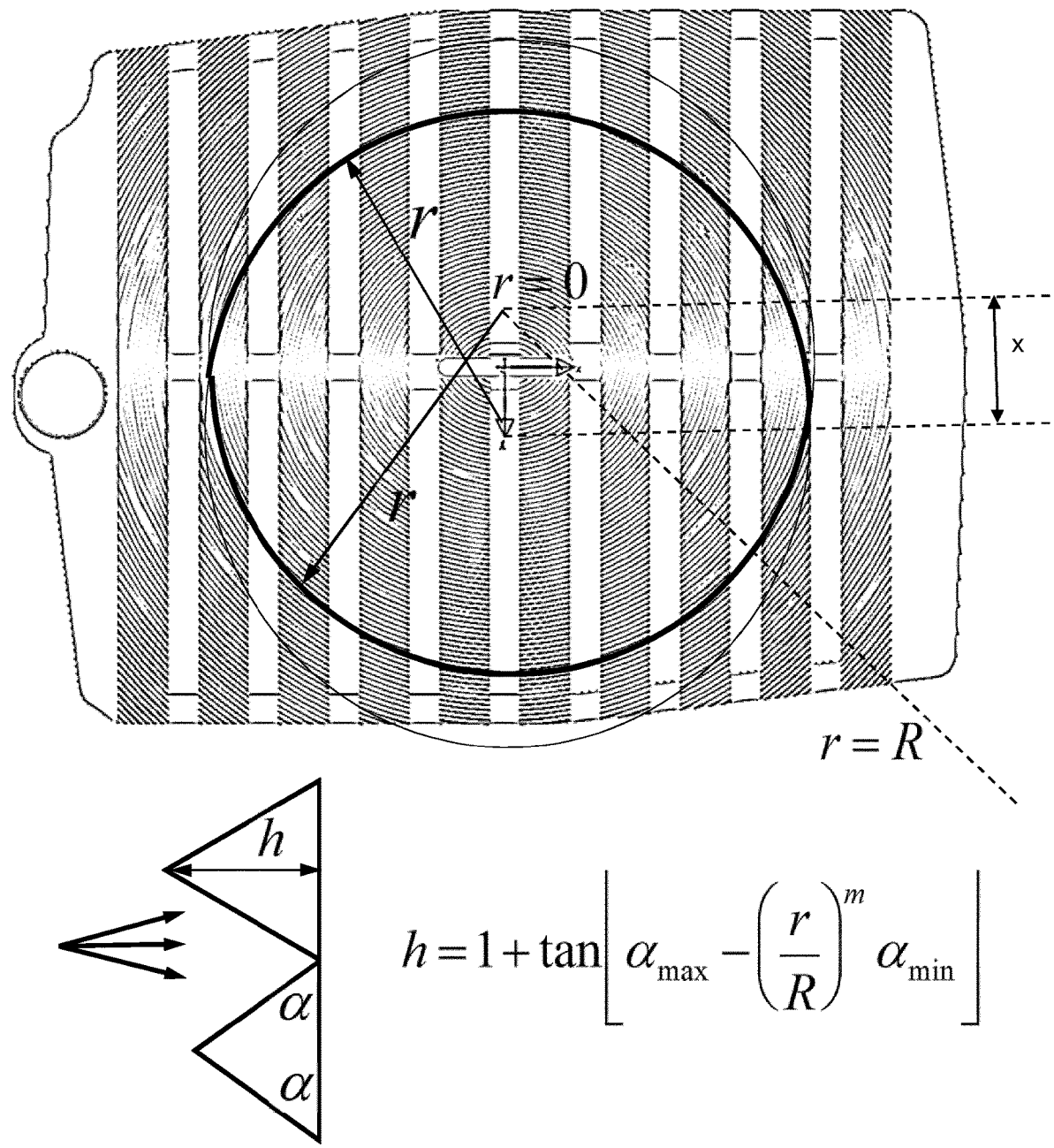
FIG. 9 shows the configuration of the prism segments.

The prism segments have a configuration as shown in FIG. 9. The tops of the prisms are directed towards the light sources. In the default state, the LEDs are located behind the gaps and only the primary, narrow beam is generated. This default state is also the most efficient configuration.

In this example the prisms define closed shapes which comprise two circular portions. An upper portion is defined by a constant radius r about a first center, and a lower portion is defined by the same constant radius r but about a second center. The centers are a distance x apart. This gives an eye-shape, i.e. one which has a greater width than height (width 2r and height 2r−x).

There is thus one global optical pattern formed by the optical sheet portion. The widths and pitch of the active and inactive strips takes into account the pitch of the LED strips, but the actual pattern is independent of the LED pitch. Thus, accurate alignment between the sheet and the LED array is not needed, at least not in one of the orthogonal directions.

Typical values for w and s are 20 mm and 12 mm. The distance (d in FIG. 8) between the top of the collimating lenses and the adjustable optical sheet is as small as possible. A typical value for d is 1 mm. The prisms have a height h as a function of the radius r which changes from the outer edge to the center:

$$h(r) = 1 + \tan\left[\alpha_{max} - \left(\frac{r}{R}\right)^m \alpha_{min}\right] \quad \text{Eq. 1}$$

In Eq. 1 α(max) is the maximum prism angle at r=R (i.e. a prism at the very edge), α(min) is the minimum prism angle at r=0. The prism angle decreases from α(max) to α(min) in a way described by the parameter m. If m=1, the prism angle decreases from α(max) to α(min) in a linear way. The "sharpest" prism (high h(r) value) is located at the edge (or outside) of the optical sheet (r=R). The prism with the lowest height is located in the center (r=0).

The value x thus represent the deviation of the closed shape formed by the prisms from a circular shape, namely the difference between the length and width of the eye-shape.

One of the beams is formed when the optical sheet portions are both shifted and rotated (as shown in FIG. 4). In this configuration, there is a partial overlap of the LED rows and the optical strips. A partially covered LED will produce a distorted/asymmetric beam. However, all these distorted beams add up to form a smooth, rotationally symmetric beam in the far field.

Figure 10:
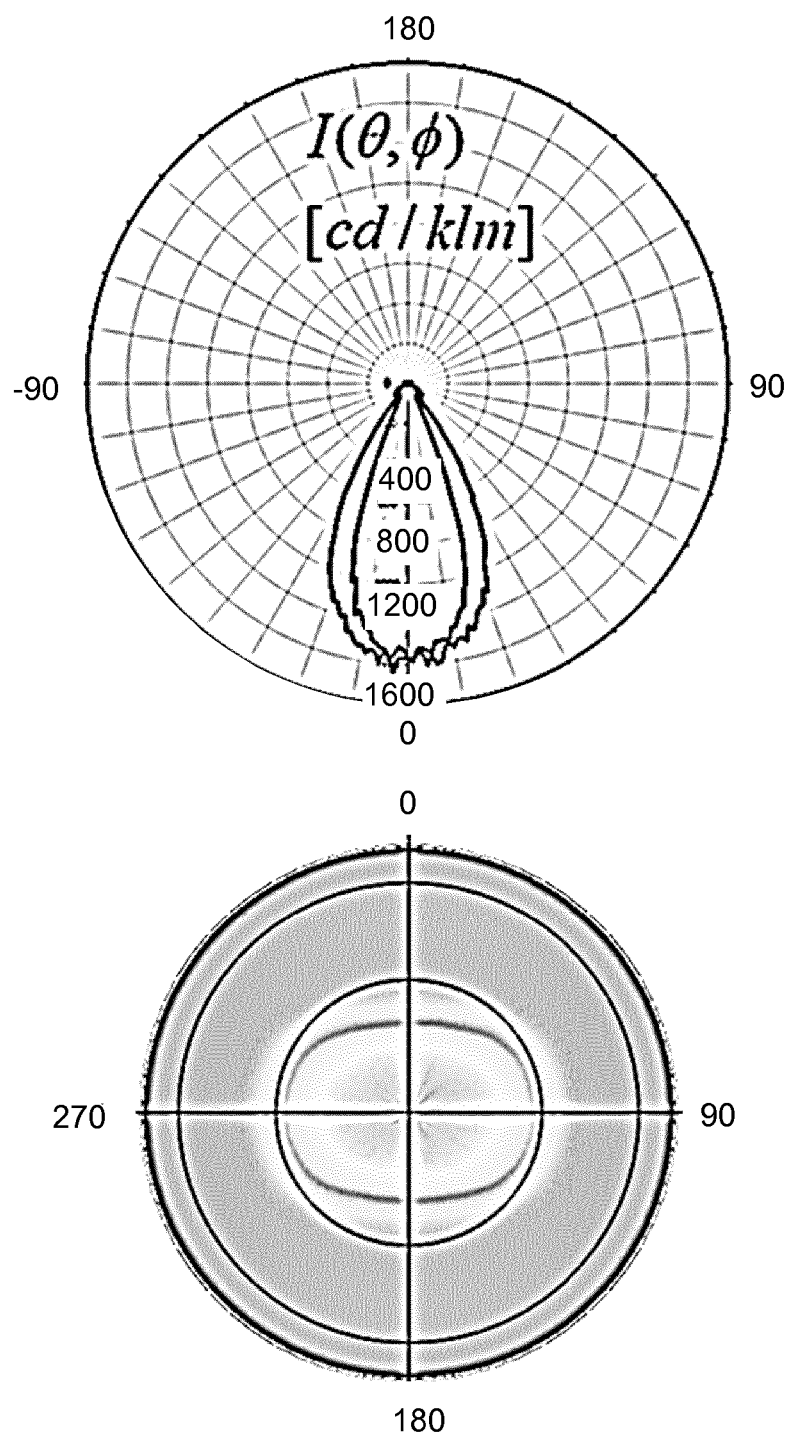
FIG. 10 shows the intensity distribution (top image) and far field beam shape (bottom image) for the default configuration with the pass through strips over the LEDs.

FIG. 10 shows the intensity distribution (top image) and far field beam shape (bottom image) for the default configuration with the gaps over the LEDs. The top image shows two plots; one for the 0-180 degree plane and one for the 90-270 degree plane. This shows a narrow beam shape.

Figure 11:
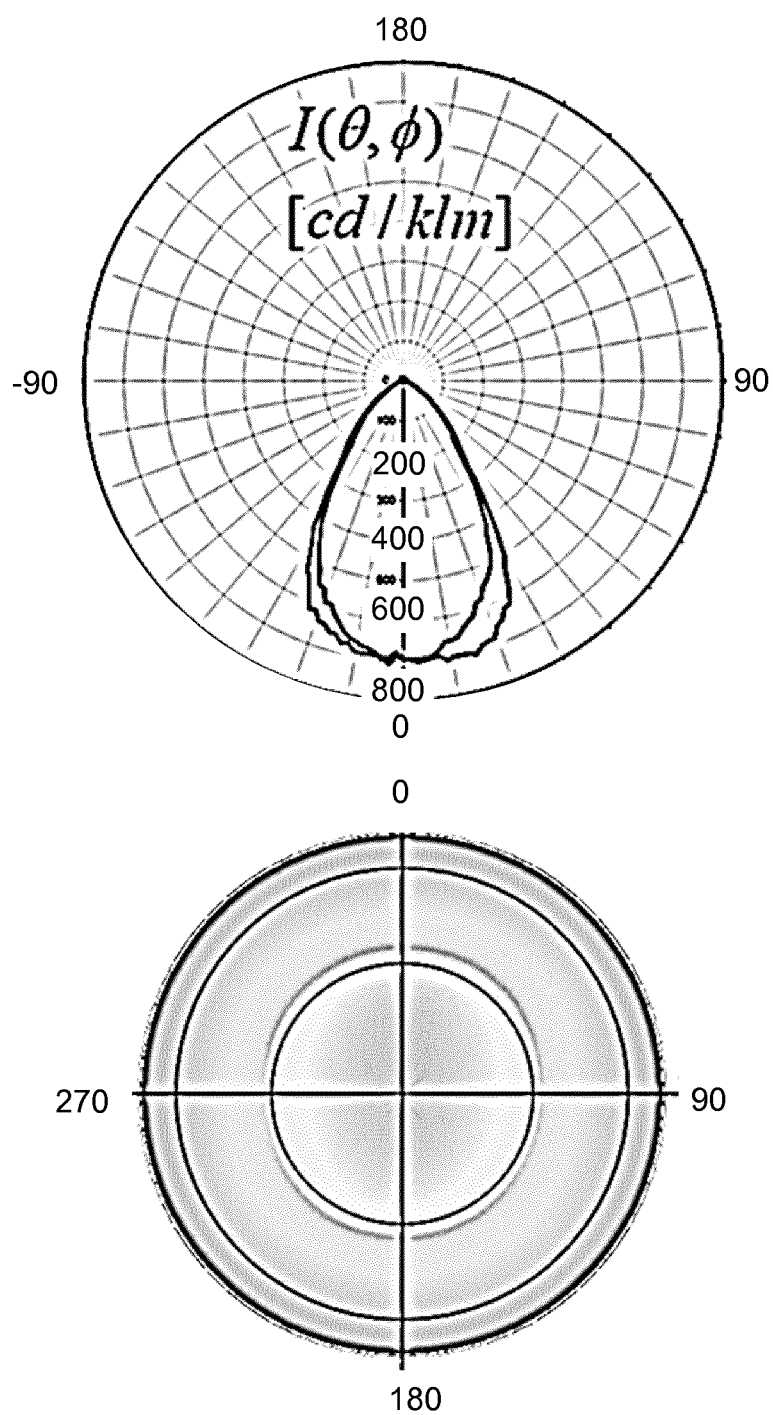
FIG. 11 shows the intensity distribution (top image) and far field beam shape (bottom image) for the configuration with rotated and translated optical sheet portions.

FIG. 11 shows the intensity distribution (top image) and far field beam shape (bottom image) for the configuration with rotated and translated optical sheet portions. The top image again shows two plots; one for the 0-180 degree plane and one for the 90-270 degree plane. This shows a medium beam width (relative to the narrow beam shape).

Figure 12:
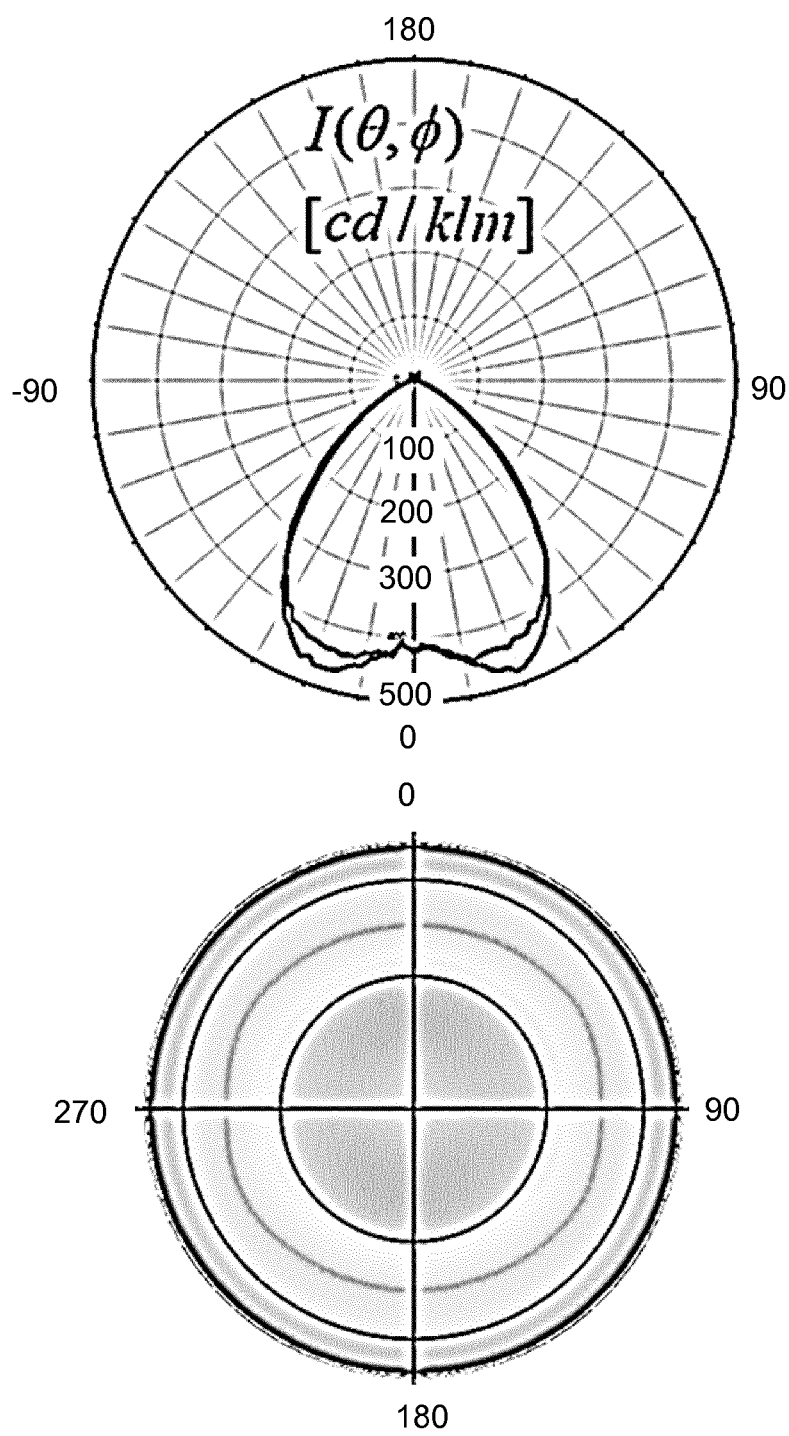
FIG. 12 shows the intensity distribution (top image) and far field beam shape (bottom image) for the configuration with only translated optical sheet portions with the optical strips over the LEDs.

FIG. 12 shows the intensity distribution (top image) and far field beam shape (bottom image) for the configuration with only translated optical sheet portions with the optical strips over the LEDs. The top image again shows two plots; one for the 0-180 degree plane and one for the 90-270 degree plane. This shows a broad beam width (relative to the other two configurations).

Figure 13:
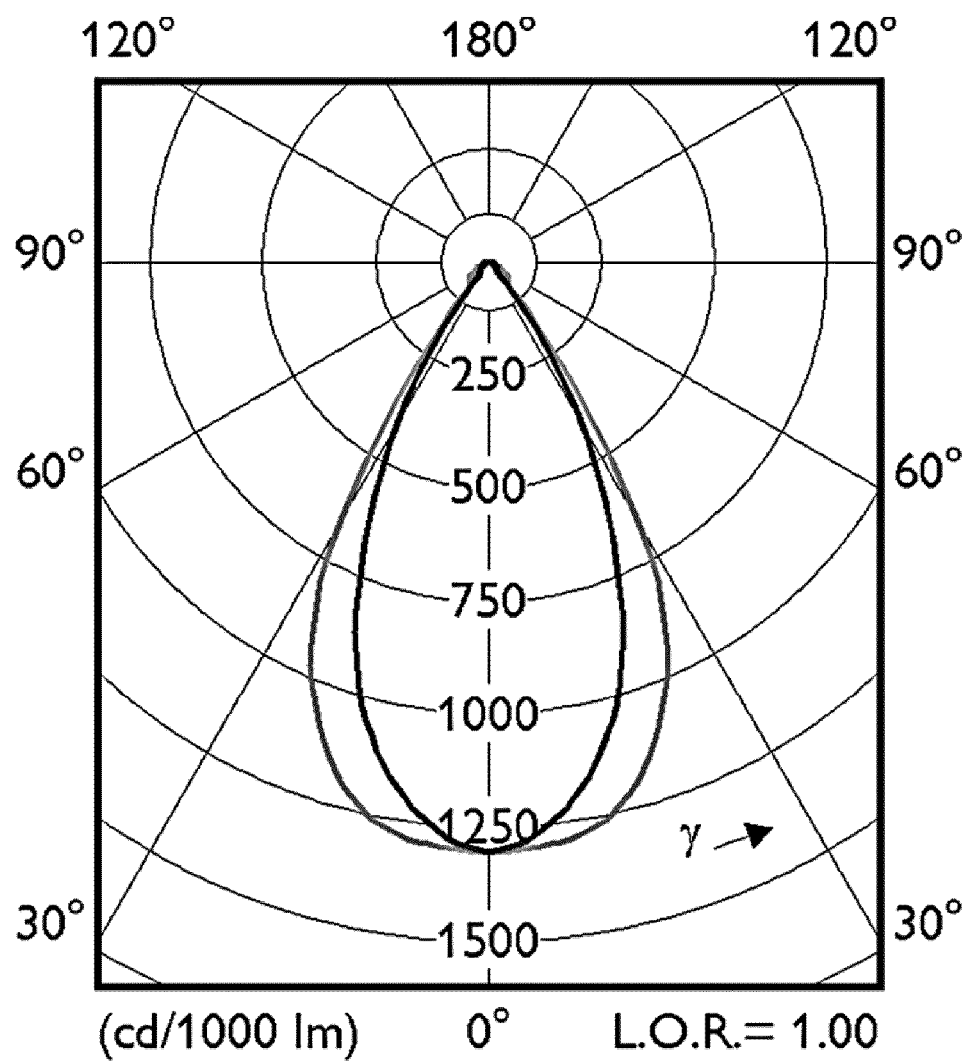
FIG. 13 shows the intensity distribution of the primary beam with the optical sheet removed.

The primary beam with the optical sheet removed is depicted in FIG. 13.

For this example the prism structure to obtain the beams is characterized by the following parameters:
R=230 mm
Prism pitch=2 mm
α(max)=54 degrees
α(min)=37 degrees
m=1
x=20 mm
s=12 mm
$P_{LEDrow}$=32.2 mm
d=1 mm
n=1.585 (refractive index of collimating lenses and optical sheet)

The upper and lower halves of each optical sheet portion are characterized by the same closed shape of the prisms and maximum radius R, and they are a mirror image of each other. The non-circular closed shape helps to make a perfectly rotationally symmetric beam for the particular LED arrangement (especially in the fully covered configuration of FIG. 6).

The choice of prisms also affects the optical efficiency of the system. In particular, for prism angles α (see FIG. 9) smaller than about 50 degrees, the transmittance is very high (>90%). This means that the optical sheet described above (α(max)=54 degrees) is highly transmissive and creates a very limited efficiency loss in the final luminaire (loss<5%).

The default state is the narrow beam setting, in which the LEDs are not covered by the optical strips. By shifting and rotation of the optical sheet portions by 16.1 mm and 6 deg. respectively, the combined effect is obtained. By only shifting the optical sheet portions by 16.1 mm from the default state, a wide beam is obtained.

The angular rotation is by an acute angle. The maximum angular rotation may for example be between 2 degrees and 15 degrees, for example between 3 and 10 degrees, and a 6 degree rotation is just one example.

There is an infinite number of settings possible between the two extreme configurations. By combining the best primary beam shape and the structures on the optical sheet, a wide range of smooth beams can be generated with full control of the beam width and glare.

It is clear from the description above that there is a large design freedom. The main parameters are:

The amount and arrangement of LEDs;

Intensity profile of the primary beam;

The type of optical structures used in the optical sheet. Prisms are preferred in many designs but other optical structures (e.g. lenslets) are also possible. The optical structures can be present on one of the two faces of the optical sheet or on both faces, or embedded within the sheet. In case of Kohler optics, the lenses are on both faces of the component;'

The geometries of the optical sheet portions (width of the slits (s), width of the parts provided with optical (micro) structures (w), distance (d) between primary collimating lens and the adjustable optical sheet, etc.);

The materials used. The optical sheets portions may be a transparent material (PC, PMMA, PET, glass) but also scattering or luminescent particles can be incorporated in the bulk material. Also foils containing optical micro-structures may be laminated on a transparent frame. The optical sheet portions may also contain a multi-layered optical structure or a (linear) polarizer. Also dyes or luminescent dyes can be incorporated in the bulk material of the adjustable optical sheet portions; and The movement of the optical sheet portions. The example above uses a relatively simple movement of the optical sheet portions (translation+rotation or translation only). Much more complex travel paths of the optical sheet portions can be designed by applying suitable slots. The movement of the optical sheet portions can be implemented manually (via a single knob with suitable setting indications) by an installer/user or can be done by a small motor in the luminaire which is for example wirelessly remotely controlled connected e.g. via Wifi to a smart phone.

The invention is of interest for any LED lighting systems. Typical examples are high bay luminaires for industrial lighting applications. However, numerous potential applications can be found in office lighting, lighting for retail/commercial spaces and outdoor lighting.

The luminaire typically has an area of the light output face (i.e. of the optical sheet) of more than 0.05 m², for example more than 0.1 m². For example, the luminaire may be rectangular, with approximate dimensions of 300 mm×600 mm. Larger luminaires are also possible, for example with area more than 0.2 m² or even more than 0.3 m².

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising:
   a planar array of LEDs comprising a set of parallel LED strips;
   an optical sheet extending over and parallel to the plane of the array of LEDs, the optical sheet comprising an interleaved pattern of parallel optical strips configured to perform a beam redirection and pass through strips, wherein the pass through strips have an average width which is at least 0.1 times the average width of the optical strips;
   a drive arrangement for moving the optical sheet relative to the array of LEDs between at least two configurations:
      a first configuration in which elongate axes of the LED strips are parallel to elongate axes of the optical strips; and
      a second configuration in which the elongate axes of the LED strips are angularly offset by an acute angle from the elongate axes of the optical strips;
   wherein the pass through strips comprise openings or planar non-textured regions between the optical strips.

2. The lighting device as claimed in claim 1, comprising an array of collimating lenses over the planar array of LEDs, with each LED associated with a collimating lens.

3. The lighting device as claimed in claim 1, wherein in the first configuration the pass through strips are arranged over the LED strips and wherein in the second configuration the optical strips partially overlap the LED strips.

4. The lighting device as claimed in claim 1, wherein the drive arrangement is for moving the optical sheet relative to the array of LEDs between at least three configurations, wherein in a third configuration the optical strips are arranged over the LED strips.

5. The lighting device as claimed in claim 1, wherein the drive arrangement is controllable to move the optical sheet relative to the array of LEDs to implement relative rotation and/or relative translation.

6. The lighting device as claimed in claim 1, wherein the planar array of LEDs comprises at least 20 LEDs, for example at least 50 LEDs.

7. The lighting device as claimed in claim 1, wherein the optical strips comprise prisms or lenses.

8. The lighting device as claimed in claim 7, wherein the optical strips comprise prism ridges which, in the plane of the sheet, define circular, elliptical or other closed shape path portions.

9. The lighting device as claimed in claim 1, wherein the LED strips have a first average pitch and the optical strips have a second average pitch, wherein the ratio of the first average pitch to the second average pitch is in the range 0.8-1.25.

10. The lighting device as claimed in claim 1, wherein the pass through strips have a width which is in a range 0.5 to 2 times the width of the optical strips.

11. The lighting device as claimed in claim 1, wherein the optical sheet comprises a set of sheet portions, which are moved relative to the array of LEDs in synchronism.

12. The lighting device as claimed in claim 1, wherein the optical sheet comprises guide slots for constraining movement of the optical sheet, wherein the guide slots implement a predetermined combination of rotation and/or translation.

13. The lighting device as claimed in claim 1, wherein the pass through strips comprise openings between the optical strips.

14. A method of controlling a light output from a lighting device, wherein the lighting device comprises a planar array of LEDs comprising a set of parallel LED strips and an optical sheet extending over and parallel to the plane of the array of LEDs, the optical sheet comprising an interleaved pattern of parallel optical strips configured to perform a beam redirection and pass through strips, wherein the pass through strips have an average width which is at least 0.1 times the average width of the optical strips, wherein the method comprises:

moving the optical sheet relative to the array of LEDs between at least two configurations:
  a first configuration in which elongate axes of the LED strips are parallel to elongate axes of the optical strips; and
  a second configuration in which the elongate axes of the LED strips are angularly offset by an acute angle from the elongate axes of the optical strips;
wherein the pass through strips comprise openings or planar non-textured regions between the optical strips.

* * * * *